Patented July 18, 1950

2,516,095

UNITED STATES PATENT OFFICE 2,516,095

PROCESS FOR PRODUCING A STABLE SULFUR SUSPENSION

Alvin Schallis, Jersey City, and John Hurley, Bayonne, N. J., assignors to Stauffer Chemical Company, a corporation of California No Drawing. Application March 28, 1947, Serial No. 738,000

3 Claims. (Cl. 252—313)

1

This invention relates to the dispersion of finely divided sulphur in water, considered both as a process and as a product.

Aqueous dispersions of finely divided sulphur have various applications in industry and agriculture. Such dispersions may be produced by extensive grinding of an ordinary form of elementary sulphur in a water-colloid environment, usually in the presence of a suitable dispersing agent; the manufacture of such a sulphur dispersion is disclosed in the Tucker Patent 2,028,482 of January 21, 1936. Such sulphur dispersions are relatively stable and can be utilized as such so long as the dispersion is not subject to a freezing temperature, one of the order of 32° F. and lower. If such a dispersion as is disclosed in the Tucker patent is subjected to a freezing temperature, the dispersed sulphur particles on thawing are found to agglomerate and settle out, the dispersion separative into two layers, a water layer and a sulphur layer; which latter cannot be redispersed in the water layer. This is of extreme importance e. g. in agricultural sulphur, which often must be purchased early in the year and thus may be subjected to freezing prior to use. Agglomerated suspensions are relatively worthless as spray materials.

We have discovered that aqueous suspensions of finely divided or colloidal sulphur which are not affected adversely by freezing can be manufactured if (1) a protective colloid is present in the dispersion and (2) the dispersion be conditioned by suitable "heat aging." More particularly, we have discovered that if an aqueous suspension of finely divided or colloidal sulphur be held at a temperature elevated above a normal atmospheric temperature for a suitable period of time, then the protective colloid is effective in preventing agglomeration of the sulphur if the dispersion is subsequently subjected to freezing followed by thawing. We have applied the term "heat-aged" to this treatment; we are still somewhat uncertain as to just what effect heat aging has but at the present time, without limiting ourselves thereto, we are of the opinion that heat aging tends to round off the edges of the sulphur and to render the sulphur less active. At any event the protective colloid appears to be ineffective unless heat aging is employed.

As suitable temperatures, one can employ any temperature relatively elevated above atmospheric; for example at 65° C. a time period of the order of fifteen minutes is required; at 60° C. a time period of the order of one hour is required; at 50° C. about four hours' time is required, while at 40° C. about twenty-four hours are required. One need not employ an elevated atmospheric temperature and the material can be suitably aged even at normal atmospheric temperatures; in this case, a period of three or four months' time may be required. The protective colloid can be present during the heat aging or it can be added subsequently.

As a suitable protective colloid, we have employed dextrin which is compatible with the sulphur and with the use to which the sulphur is subsequently to be put. Such other protective colloids are gum arabic, tragacanth, agar, pectin, glue. Compatible mixtures are also useful.

The heat aging can be practiced in various ways. For example, when the finely divided sulphur is formed by grinding or equivalent comminution operation, such as is disclosed in the Tucker Patent 2,028,482, or in the Klein Patent 1,956,293, the vessel in which the comminution is conducted may be suitably heat insulated to retain the heat created by the grinding or, if desired, heat may be supplied to the grinding equipment from an external source, or the sulphur dispersion may be held in a suitably heated vat for an adequate period of time.

In preparing the sulphur suspension, only a small quantity of the protective colloid is required in a suitably heat-aged dispersion. For example, in a typical sulphur dispersion prepared in accordance with this invention and containing approximately 70% by weight of sulphur, approximately 30% by weight of water and 1% of the dispersing agent identified in the Tucker patent, it was only necessary to add .5% of dextrin to provide a stable dispersion which remained stable and in which the sulphur agglomeration was absent even though the material was repeatedly subjected alternately to temperatures above and below freezing.

The dispersing agent identified in the Tucker patent was obtained by condensing an aldehyde with a sulfonic acid of the naphthalene series. It was prepared in the following manner: To 100 parts of concentrated sulphuric acid (specific gravity 1.84) contained in a suitable sulphonator and maintained at 160° C. are added slowly with stirring 100 parts of refined naphthalene. After all of the naphthalene has been introduced (this operation generally requires about one hour), the mass is stirred at 160° C. for four hours longer or until a test shows that substantially none of the naphthalene remains unsulphonated. The sulphonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for three hours longer at 80° C., but at the end of each successive hour there are added 12 parts more of formaldehyde solution, making a total at the end of the three hours of four portions or 48 parts in all. After all the formaldehyde has been added, the temperature is progressively raised over a period of one hour to 95-100° C. where it is maintained for 18 hours while the mass is constantly stirred. Soon after the temperature has been raised to 95-100° C., it is found that substantially none of the aldehyde remains unconsumed in the condensation reaction. During the later stages of the 18-hour heating period, the mixture progressively thickens until at the end it generally reaches the consistency of thick molasses. If this thickening becomes so great, however, as to prevent proper stirring, a small quantity of water may be added to keep the material liquid. After the heating is completed, the mixture is cooled, neutralized with a suitable alkali, e. g. sodium hydroxide, and, if desired, dried. It is then ready for use.

We claim:

1. In a process for decreasing the damage occasioned by agglomeration upon freezing of an aqueous suspension containing a protective colloid and approximately 70% by weight of finely divided solid sulfur, the step consisting essentially in heating an aqueous suspension of finely divided solid sulfur under atmospheric pressure to a temperature of about 60° C. and maintaining said suspension at said temperature and pressure for only about one hour.

2. In a process for decreasing the damage occasioned by agglomeration upon freezing of an aqueous suspension containing a protective colloid and approximately 70% by weight of finely divided solid sulfur, the step consisting essentially in heating an aqueous suspension of finely divided solid sulfur under atmospheric pressure to a temperature of about 65° C. to 50° C. and maintaining said suspension at said temperature and pressure for a period from about 15 minutes to about 4 hours, the time being approximately inversely proportional to the temperature at which the suspension is maintained over the respective ranges specified.

3. In a process for decreasing the damage occasioned by agglomeration upon freezing of an aqueous suspension containing a protective colloid and approximately 70% by weight of finely divided solid sulfur, the step consisting essentially in heating an aqueous suspension of finely divided solid sulfur under atmospheric pressure to a temperature of about 65° C. to 40° C. and maintaining said suspension at said temperature and pressure for a period from about 15 minutes to 24 hours, the time being approximately inversely proportional to the temperature at which the suspension is maintained over the respective ranges specified.

ALVIN SCHALLIS.
JOHN HURLEY.

REFERENCES CITED

The following references are of record in the file of this patent:

UNITED STATES PATENTS

| Number | Name | Date |
| --- | --- | --- |
| 1,956,293 | Klein et al. | Apr. 24, 1934 |
| 2,028,482 | Tucker | Jan. 21, 1936 |
| 2,094,939 | Boulogne | Oct. 5, 1937 |
| 2,348,736 | Heath | May 16, 1944 |